Sept. 6, 1960            D. JOHNSTON            2,951,495
APPARATUS FOR DIVIDING A SOURCE OF FLUID
INTO THREE OR MORE PARTS
Filed April 26, 1956                        2 Sheets-Sheet 2
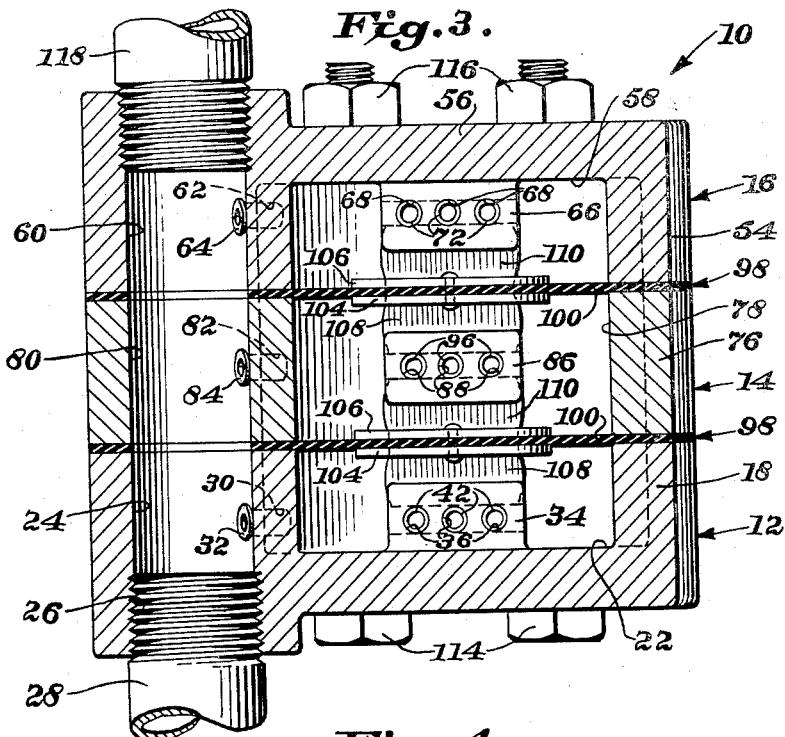
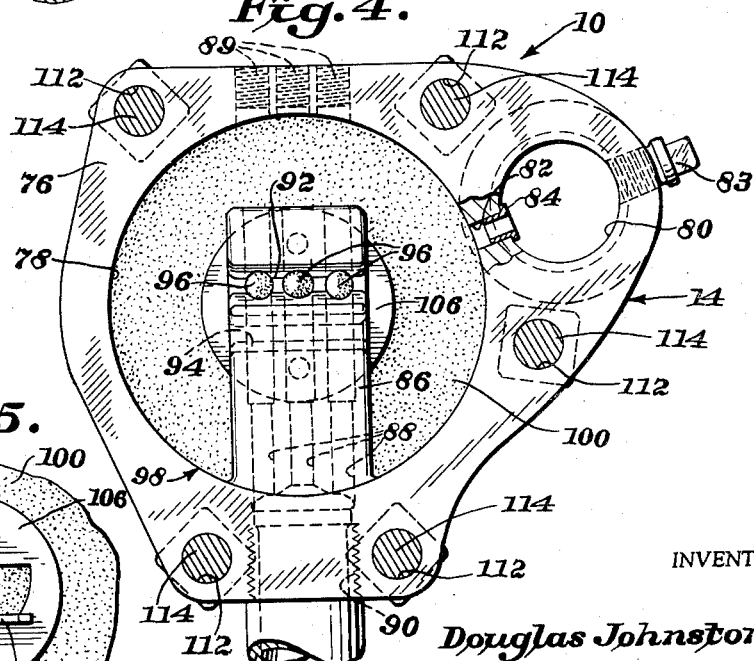
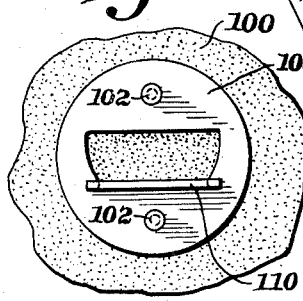
INVENTOR:
Douglas Johnston,
BY Cushman, Darby & Cushman
ATTORNEYS.

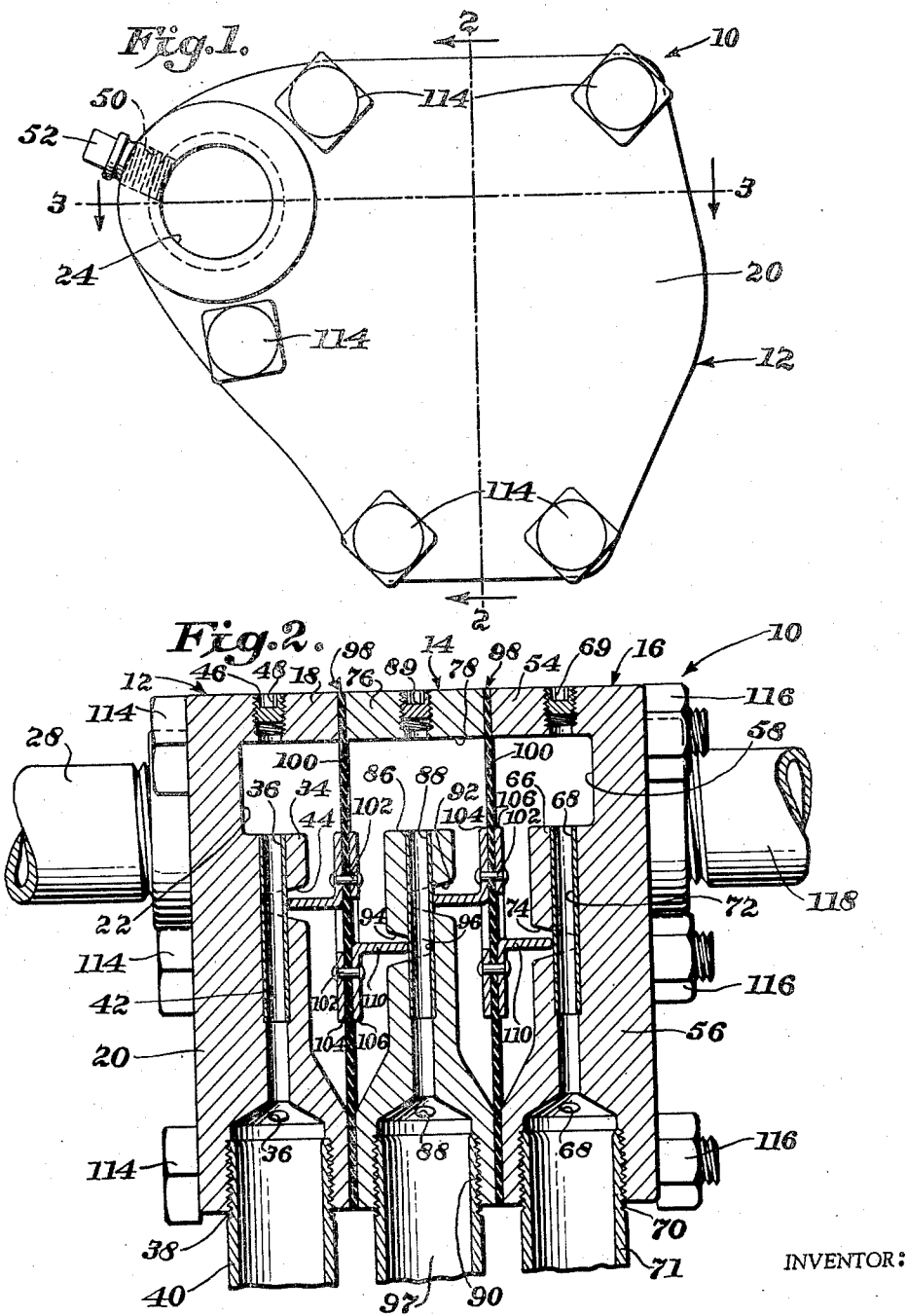

United States Patent Office 2,951,495
Patented Sept. 6, 1960

2,951,495

APPARATUS FOR DIVIDING A SOURCE OF FLUID INTO THREE OR MORE PARTS

Douglas Johnston, Huntsville, Ala., assignor to John Blue Company, Incorporated, Huntsville, Ala., a corporation of Alabama Filed Apr. 26, 1956, Ser. No. 580,847

9 Claims. (Cl. 137—101)

This invention relates to the distribution of fluids and more particularly to an apparatus and procedure for dividing a source of fluid into three or more parts in constant ratio.

While the present invention is of general utility, it is particularly applicable to the farm implement art for use in distributing fluid chemicals to a plurality of earthworking applicators for purposes of fertilizing the soil and the like. Heretofore, this procedure has been carried out with the use of a metering pump arranged to deliver the fluid through separate hoses to the plurality of applicators from a centrally located manifold. The flow was divided by making all paths as nearly geometrically equal as possible. This procedure entailed the utilization of equal lengths of hose extending from the manifold to the points of distribution. From time to time in the field, the operator was required to cut off a hose due to breakage or other reasons. Moreover, hoses tend to deteriorate in service causing the resistances between one hose and the others to vary. Furthermore, the excessive length of hose required to feed the outermost applicators on the average machine necessitated the coiling or folding of the central hose to the applicators next to the manifold in order to keep the same from dragging on the ground. Consequently, these folds tend to kink and to change the resistance.

Another serious problem with the procedures heretofore carried out arises when the fluid is distributed on hillsides, which frequently have slopes as high as 30°. Under these conditions, the upper hillside of the applicator on very wide machines may have a static head of as much as ten feet greater than the lower side of the machine. This condition results in the lower side of the machine receiving the most fluid and, of course, the condition cannot be simply alleviated since on the return run, the side that was higher previously is now disposed on the lower side of the hill.

In addition, the problems are particularly acute in some areas where the crops are extremely sensitive to the amount of fluid applied. Unless extreme care is taken in the application, the crops will come up in unequal rows. That is, some of the plants will grow so high they fall over and the grain is lost, as in the case of rice, while other plants do not get enough fluid to fully develop. This problem has forced some farmers to reject the use of fluid chemicals as a fertilizer.

Still another problem arises due to the particular condition of the soil. The applicator machinery heretofore provided included outlet holes which frequently fill up with dirt so that the flow of fluid is completely cut off. That is especially troublesome in damp soil where the rate of output of fluid, such as ammonia, is relatively low.

Accordingly, it is an object of the present invention to provide an apparatus which will positively distribute the main source of fluid equally or at constant ratio to each of a plurality of applicators so as to substantially overcome the disadvantages noted above.

A further object of the present invention is the provision of a novel fluid proportioning apparatus constructed of a plurality of cells or sections so as to enable the same to be readily modified to accommodate applicators of any desirable number.

Still another object of the present invention is the provision of a novel flow proportioning apparatus which is simple in construction, economical to manufacture and maintain and efficient in operation.

These and other objects of the present invention will become more apparent during the course of the following detailed description and appended claims.

The invention may best be understood with reference to the accompanying drawings wherein an illustrative embodiment is shown.

In the drawings:

Figure 1 is a side elevational view of a proportioning apparatus constructed in accordance with the principles of the present invention;

Figure 2 is a cross-sectional view taken along line 2—2 of Figure 1;

Figure 3 is a cross-sectional view taken along line 3—3 of Figure 1;

Figure 4 is a side elevational view of the apparatus with an end cell and associated diaphragm removed therefrom; and Figure 5 is an enlarged fragmentary side elevational view of the diaphragm construction.

As was previously noted above, the present invention is particularly applicable for use in proportioning the flow of chemical fluids from a constant pressure source to a plurality of applicator blades of an agricultural implement so as to distribute the fluid to the earth for fertilization purposes. The fluid may be a liquid, a gas, or any homogeneous mixture of liquid and gas, such as anhydrous ammonia, nitrogen solution, liquid fertilizers, fumigants and other types of chemicals adapted to be applied or injected on or below the surface of the soil. Since machines of this type vary in the number of applicators utilized, it is desirable to provide a proportioning apparatus which may be readily varied to accommodate any number of applicators.

Accordingly, in the drawings there is shown an apparatus, generally indicated at 10, embodying the principles of the present invention which may be so modified. As more particularly shown in Figure 2, the apparatus 10 is illustrated as including three cells or sections 12, 14 and 16 suitable to divide the flow from the main source (not shown) to three applicators (not shown). The end cells or sections 12 and 16 are substantial mirror images of each other and the intermediate cell or section 14 is substantially symmetrical. With this arrangement, it is contemplated that any number of intermediate cells may be employed between the end cells depending upon the particular requirements. For use in an applicator machine of the type noted above, a practical limit to the number of cells will be of an order of 12–14. If a machine is equipped with a greater number of applicators, it is contemplated that the source of fluid may be initially divided into two paths and each path fed into an apparatus similar to that shown.

The right hand end cell 12 comprises a peripheral wall 18 having an end wall 20 enclosing one end thereof. The walls 18 and 20 together define a main cell cavity 22 which is preferably cylindrical in shape and opens to the opposite end of the cell. Formed in the peripheral wall 18 in parallel relation to the cavity 22 is a cylindrical opening 24 having the end thereof adjacent the end wall 20 internally threaded, as at 26, to receive a pipe 28 arranged to conduct the main supply of fluid thereto. Extending between the opening 24 and the cavity 22 is an aperture 30 within which an orifice element or nozzle 32 is suitably secured.

Extending transversely from the peripheral wall 18 into the central interior of the cavity 22 is a vertical cell portion 34. This portion may have one or more outlet passageways 36 formed therein and, as shown, three parallel passageways are provided. The portion of the peripheral wall 18 adjacent the outer end of the cell portion 34 is provided with an outlet bore 38 which may be internally threaded to receive an outlet hose 40 for directing the fluid to the applicators or other instrumentalities. The bore 38 communicates with the outer ends of the passageways 36, and the inner ends of the latter communicate with the interior of the cell cavity 22. Disposed within the upper portion of each passageway 36 is a flexible tube 42 of any suitable material, such as neoprene and the like. Preferably, the tubes 42 have soft thin walls and are fixedly secured within the passageways 36 by any suitable means, such as cement or the like. A longitudinally extending opening 44 extends outwardly from the passageways 36 toward the open end of the cavity 22. Preferably, this opening tapers outwardly for a purpose hereinafter to be more fully explained.

If desired, threaded access openings 46 may be formed in the peripheral wall 18 opposite from the outlet bore 38 and in alignment with the passageways 36. In operation, these openings are sealed by any suitable means, such as threaded plugs 48. Likewise, the peripheral wall 18 may be provided with a threaded access opening 50 opposite the aperture 30 so as to permit removal of the orifice element 32. This opening is also arranged to be sealed during normal use, as by a threaded plug 52.

The right hand end cell 16 is constructed similar to the left hand end cell 12 and differs therefrom in those modifications necessary to make the same a substantial mirror image of the left hand end cell 12. Consequently, a detailed description of the right hand end cell is not believed necessary. It is sufficient to recite that the right hand end cell 16 includes a peripheral wall 54, an end wall 56, a central cavity 58, an intake opening 60, an inlet opening 62, an orifice element or nozzle 64, a nozzle access opening plug (not shown), a cell portion 66, outlet passageways 68, passageway access opening plugs 69, an outlet bore 70, an outlet hose 71, flexible tubes 72 and longitudinal opening 74. It will be noted, however, that the position of the longitudinal, outwardly tapering opening 74 of the cell 16 is different from the position of the opening 44 of the cell 12 in that the latter is spaced vertically above the former. The reason for this difference will become apparent hereinafter.

As was noted above, the apparatus of the present invention is made up of a left hand end cell, a right hand end cell and any number of intermediate cells depending upon the particular requirements. All of the intermediate cells are identical and, therefore, in the drawings, only one such cell has been shown, although it will be understood that additional cells may be provided, as desired.

The intermediate cell 14 comprises a peripheral wall 76 defining a main central cavity 78 which extends completely through the cell. An intake opening 80 is formed within the peripheral wall 76 parallel with the cavity 78 and a transversely extending opening 82 is formed in the peripheral wall between the opening 80 and main cavity 78. An orifice element or nozzle 84, similar to the elements 32 and 64, previously described, is disposed within the opening 82 and an access opening plug 83 is threaded into the wall 76 at a position opposite from the opening 82. See Figure 4. Extending from the interior of the peripheral wall into the central portion of the cavity 78 is a cell portion 86. This portion has a plurality of transversely extending outlet passageways 88 formed therein. Access opening plugs 89 are threaded into the wall 78 at positions opposite from the passageways 88. The portion of the peripheral wall 78 adjacent the outer end of the cell portion 86 is formed with an outlet bore 90 which communicates with the outer ends of the passageways 88 and the inner end of these passageways communicate with the central interior of the cavity 78. Formed in the cell portion 86 is a pair of longitudinally extending, outwardly tapering openings 92 and 94. The upper opening 92 is similar to the opening 44 described in connection with the left hand cell 12, while the lower opening 94 is similar to the opening 74 described in connection with the right hand cell 16. As before, a flexible tube 96 is suitably secured within each of the passageways 88 and an outlet hose 97 leads from the bore 90.

From the above, it can be seen that the three main components of the apparatus 10 can be readily formed in a simple molding operation and of particular significance is the fact that the apparatus can be readily modified to divide the source of fluid into any number of parts merely by the expedient of providing a corresponding number of intermediate cells in addition to the end cells. In assembling the apparatus, a pressure-sensitive device, generally indicated at 98, is provided between each pair of adjacent cells. The device 98 preferably takes the form of a flexible diaphragm 100 which may be made of rubber or other suitable material. Preferably, the diaphragm 100 is shaped to conform with the shape of the peripheral walls of the cells, so that a peripheral portion of the diaphragm will serve as a gasket or pressure-tight seal when the cells are assembled.

The central portion of each diaphragm has suitably mounted thereon, as by rivets 102 or the like, a pair of circular plates 104 and 106. These plates are substantially identical, but are mounted in inverted relation with respect to each other. As best shown in Figure 2, the plate 104 has an arm 108 struck therefrom and bent upwardly at right angles to the surface of the plate so as to extend longitudinally outwardly from the diaphragm. The outer end of this arm 108 is arranged to enter within an upwardly disposed opening, such as the opening 44 or 92. In a like manner, the plate 106 (see Figure 5) includes a downwardly bent arm 110 extending outwardly from the diaphragm so as to enter a downwardly disposed opening, such as the opening 74 or 94. As previously indicated, the apparatus 10 is assembled with a pressure-responsive device 98 between each pair of adjacent cells. To effect this assembly, each cell is provided with a plurality of spaced aligned apertures 112 (see Figure 4) through which bolts 114 extend. Nuts 116 are threaded on the ends of the bolts to effect final assembly.

In operation, a suitable source of fluid (not shown) is directed into the manifold intake defined by the openings 24, 60 and 80 as by conduit 28. Where a relatively low number of cells are employed, the supply may be introduced into the manifold at one end thereof, as, for example through pipe 28, with the other end being sealed by a suitable plug (not shown). Where a large number of cells are employed, it is preferable to provide a T connection from the supply and direct the supply along two pipes and into the manifold from both ends. An additional pipe 118 is shown in Figure 3 to illustrate this connection. The fluid supply which enters the intake manifold is preferably at a substantially constant pressure, and the above arrangement reduces any tendency for there to be a pressure differential between the cells.

The present apparatus operates on the principle that if the pressure drop of the supply across each inlet orifice is maintained substantially equal or at constant ratio, then the flow into each cavity and, consequently, out of each cavity will be substantially equal or at constant ratio. Thus, for the purposes of obtaining equal flow division, the orifice elements 32, 84 and 64 are constructed to have dimensions as nearly equal as possible and with a substantially constant pressure in the manifold, it is necessary merely to maintain substantially equal pressures within the cavities in order to insure an equal amount of flow from each cavity. Equal pressure is maintained in the cavities in the following manner: normally, the resistance to flow through and from all cavities is equal, so that the pressures within all cavities is likewise equal and, hence, equal flow results. However, assuming that one of the outlet hoses, as for example the hose 40 which leads to an applicator or the like, is accidentally kinked, or for some other reason, perhaps static elevation, an increased resistance is introduced into this line; then a back pressure will be built up into the associated cell cavity 22. This increased cavity pressure will immediately cause the adjacent diaphragm 100, between cells 12 and 14, to expand outwardly and move into the intermediate cell cavity 78. This movement of the diaphragm will, in turn, move the outer end of the arm 110 through the opening 94 and into engagement with the flexible tube 88 so as to pinch the thin wall thereof. The arrangement is such that for a given pressure in the cavity 22, the arm 110 will move the flexible hoses 88 inwardly sufficient to restrict the flow from the cavity 78 so as to built up a pressure therein equal to the pressure in the cavity 22. Immediately in response to the increased pressure within the cavity 78, the diaphragm 100, between the intermediate cell 14 and right hand cell 16, will be deflected into the cavity 58 of the latter. This movement will effect a corresponding movement of the arm 110 into engagement with the flexible hoses 68 of the right hand end cavity thus producing a pressure within the cavity 58 which is equal to the pressures within the other two cavities. In this way, an increase in the pressure of any one cavity will result in an increase in pressure of substantially the same amount in the remaining cavities. If, for example, the pressure in cavity 78 increases ten pounds per square inch, the pressure in the cavities 58 and 22 will likewise be increased ten pounds per square inch. However, it is to be noted that if the pressure caused by resistance in cell 12 is built up within the cavity 22 to ten pounds per square inch, and, at the same time, another resistance in cell 16 causes a pressure to build up in the cavity 58 to a value of nine pounds per square inch, the pressure in each cell is equalized to a value of ten pounds per square inch, and not nineteen pounds per square inch, which is obtained by adding the pressures caused by both resistances. It is also to be noted that it is immaterial where the resistance occurs, whether in any one cell or any combination of more than one, the pressures in all cells will be made equal to the pressure built up by the highest resistance. As originally noted, with equal pressures in the cell cavities, there will be equal pressure drops across the orifices and, hence, equal flow into and out of the cell cavities.

It is apparent that some small force is required to move the diaphragms so that the arms will pinch the flexible hoses. However, the areas of the diaphragm is relatively large so that the pressure on the diaphragm required to pinch the hoses is almost negligible and for this reason an infinite number of cells may be used with hardly a detectable pressure difference between the cell. The flexible neoprene tubes are preferably cemented into the passageways so that they will not collapse at the top or pull out. The openings exposing the tubes to the pinching of the diaphragm arms are tapered outwardly to permit this action to easily take place and also to prevent the necessity of accurately locating the diaphragm arms.

It thus will be seen that the objects of this invention have been full and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirt and scope of the following claims.

I claim:
1. Apparatus for dividing a supply of fluid into at least three parts in constant ratio comprising means defining at least three cavities each having orifice means leading therein to communicate the fluid supply therewith, and outlet means leading therefrom, pressure responsive means forming a fluid-tight separation between each pair of adjacent cavities, and means connected with each pressure responsive means for restricting the outlet means of either adjacent cavity in response to an increase in fluid pressure in the other adjacent cavity whereby the pressure in each cavity will be maintained in constant ratio to the highest pressure in any one cavity.

2. A fluid proportioning apparatus comprising a pair of end cells, each defining an inwardly opening cavity, at least one intermediate cell having a cavity extending longitudinally therethrough, a flexible diaphragm between each pair of adjacent cells, and means for securing said cells together in longitudinal alignment with the peripheral portion of said diaphragms serving as a fluid-tight pressure seal between adjacent cells, said cells together defining a manifold intake, each cell having an inlet leading to its cavity from said manifold and an outlet leading from its cavity.

3. An apparatus as defined in claim 2, wherein each diaphragm includes means operatively associated therewith for restricting the outlet of either adjacent cavity in response to an increase in fluid pressure in the other adjacent cavity whereby the pressure in each cavity will be maintained substantially equal to the highest pressure in any one cavity.

4. In a fluid proportioning apparatus, a cell having a peripheral wall defining a central longitudinally extending cavity, means enclosing one end of said cavity, a flexible diaphragm enclosing the other end of said cavity, said peripheral wall having a manifold opening formed therein parallel with said cavity, an inlet orifice extending transversely between said manifold opening and said cavity, a transversely disposed cell portion extending from said peripheral wall into the central interior of said cavity, said portion having a transversely extending outlet passageway formed therein communicating said cavity with the exterior of said cell, a flexible tube secured in said passageway, and an opening extending longitudinally from said passageway toward said diaphragm, and a circular plate connected with said diaphragm, and an arm struck out of said circular plate movable within said cell portion opening for engaging the tube disposed within said passageway to restrict the flow therethrough.

5. In a fluid proportioning apparatus, a cell having a peripheral wall defining a cavity extending longitudinally through said cell and a transversely extending port communicating with said cavity, a transversely disposed cell portion extending from said peripheral wall into the central interior of said cavity, said portion having a transversely extending passageway formed therein for communication with said cavity and passage means extending longitudinally outwardly from said passageway, pressure-sensitive members inclosing opposite ends of said cavity, and flow restricting means extending longitudinally inwardly from each member for movement within said passage means.

6. Apparatus as defined in claim 5 wherein said passage means comprises transversely spaced openings extending longitudinally outwardly toward opposite ends of said cavity.

7. Apparatus as defined in claim 6 wherein said passageway includes a flexible tube secured therein and arranged to be engaged by said flow restricting means.

8. Apparatus as defined in claim 7 wherein said flow restricting means comprises an arm extending longitudinally inwardly from each member into the associated opening.

9. Apparatus as defined in claim 5 wherein said cell portion includes a plurality of said passageways disposed parallel with each other.

References Cited in the file of this patent

UNITED STATES PATENTS

| | | |
|---|---|---|
| 2,145,114 | Gibbs | Jan. 24, 1939 |
| 2,409,768 | Lavett et al. | Oct. 22, 1946 |
| 2,414,842 | Trexler | Jan. 28, 1947 |
| 2,590,396 | Garretson | Mar. 25, 1952 |
| 2,661,756 | Noon et al. | Dec. 8, 1953 |
| 2,669,482 | Gold | Feb. 16, 1954 |
| 2,736,332 | Semmons | Feb. 28, 1956 |
| 2,786,608 | Brown | Mar. 26, 1957 |

FOREIGN PATENTS

| | | |
|---|---|---|
| 577,132 | Great Britain | May 7, 1946 |